United States Patent
Lee (10) Patent No.: US 8,218,030 B2
(45) Date of Patent: Jul. 10, 2012

(54) DIGITAL IMAGE PROCESSING APPARATUS AND METHOD OF CONTROLLING THE SAME WHERE AN IMAGE SIZE MAY BE REDUCED TO INCREASE BRIGHTNESS

(75) Inventor: Seok-goun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 12/692,706

(22) Filed: Jan. 25, 2010

(65) Prior Publication Data

US 2010/0201847 A1    Aug. 12, 2010

(30) Foreign Application Priority Data

Feb. 12, 2009  (KR) .................. 10-2009-0011496

(51) Int. Cl.
*H04N 5/235*    (2006.01)
(52) U.S. Cl. .................. 348/230.1; 348/362
(58) Field of Classification Search .......... 348/216.1, 348/229.1, 230.1, 302, 308, 362
See application file for complete search history.

(56) References Cited

U.S. PATENT DOCUMENTS

| | | | |
|---|---|---|---|
| 7,345,704 B2 * | 3/2008 | Sakaguchi ............. 348/282 |
| 2001/0010554 A1 * | 8/2001 | Yoshida ............. 348/312 |
| 2003/0151687 A1 * | 8/2003 | Yoshida ............. 348/333.03 |
| 2003/0189663 A1 * | 10/2003 | Dolt et al. ............. 348/362 |
| 2004/0061797 A1 * | 4/2004 | Takahashi et al. ....... 348/333.01 |
| 2005/0190274 A1 * | 9/2005 | Yoshikawa et al. ...... 348/231.99 |
| 2006/0285007 A1 * | 12/2006 | Yuyama et al. ......... 348/362 |
| 2007/0206941 A1 * | 9/2007 | Maruyama et al. ....... 396/153 |
| 2007/0215791 A1 * | 9/2007 | Yamamoto ............. 250/208.1 |
| 2010/0177214 A1 * | 7/2010 | Ozaki et al. ........... 348/234 |
| 2010/0231748 A1 * | 9/2010 | Takeda ............. 348/229.1 |
| 2011/0267495 A1 * | 11/2011 | Atkinson ........... 348/229.1 |

FOREIGN PATENT DOCUMENTS

| | | | |
|---|---|---|---|
| JP | 2001285684 A | * | 10/2001 |
| JP | 2005115598 A | * | 4/2005 |
| JP | 2007251343 A | * | 9/2007 |

* cited by examiner

*Primary Examiner* — John Villecco
(74) *Attorney, Agent, or Firm* — Drinker Biddle & Reath LLP

(57) ABSTRACT

Provided are a digital image processing apparatus capable of photographing an image of which an ISO sensitivity-to-noise ratio is improved by adjusting a size of the image to be photographed in low light conditions, and a method of controlling the digital image processing apparatus. The method includes the operations of receiving an input image; measuring input brightness of the input image; determining whether the input brightness is lower than an appropriate brightness; and generating an intermediate image by reducing a size of the input image by using an add mode for each pixel if the input brightness is lower than the appropriate brightness.

12 Claims, 7 Drawing Sheets

| 3 | 5 | 8 | 10 | 13 | 15 |
|---|---|---|---|---|---|
| 26 | 28 | 31 | 33 | 36 | 38 |
| 49 | 51 | 54 | 56 | 59 | 62 |
| 72 | 74 | 77 | 79 | 82 | 85 |
| 95 | 97 | 100 | 103 | 105 | 108 |
| 118 | 121 | 123 | 125 | 128 | 131 |

FIG. 7

| 3 | 4 | 5 | 6 | 8 | 9 | 10 | 12 | 13 | 14 | 15 | 15 |
|---|---|---|---|---|---|---|---|---|---|---|---|
| 14 | 15 | 17 | 18 | 19 | 21 | 22 | 23 | 24 | 26 | 27 | 27 |
| 26 | 27 | 28 | 29 | 31 | 32 | 33 | 35 | 36 | 37 | 38 | 38 |
| 37 | 38 | 40 | 41 | 42 | 44 | 45 | 46 | 47 | 49 | 50 | 50 |
| 49 | 50 | 51 | 53 | 54 | 55 | 56 | 58 | 59 | 60 | 62 | 62 |
| 60 | 62 | 63 | 64 | 65 | 67 | 68 | 69 | 71 | 72 | 73 | 73 |
| 72 | 73 | 74 | 76 | 77 | 78 | 79 | 81 | 82 | 83 | 85 | 85 |
| 83 | 85 | 86 | 87 | 88 | 90 | 91 | 92 | 94 | 95 | 96 | 96 |
| 95 | 96 | 97 | 99 | 100 | 101 | 103 | 104 | 105 | 106 | 108 | 108 |
| 106 | 108 | 109 | 110 | 112 | 113 | 114 | 115 | 117 | 118 | 119 | 119 |
| 118 | 119 | 121 | 122 | 123 | 124 | 126 | 127 | 128 | 129 | 131 | 131 |
| 118 | 119 | 121 | 122 | 123 | 124 | 126 | 127 | 128 | 129 | 131 | 131 |

DIGITAL IMAGE PROCESSING APPARATUS AND METHOD OF CONTROLLING THE SAME WHERE AN IMAGE SIZE MAY BE REDUCED TO INCREASE BRIGHTNESS

CROSS-REFERENCE TO RELATED PATENT APPLICATION

This application claims the benefit of Korean Patent Application No. 10-2009-0011496, filed on Feb. 12, 2009, in the Korean Intellectual Property Office, the disclosure of which is incorporated herein in its entirety by reference.

BACKGROUND

The present invention relates to a digital image processing apparatus and a method of controlling the digital image processing apparatus, and more particularly, to a digital image processing apparatus capable of performing an automatic photographing operation that automatically controls brightness, color, and sharpness of an image according to surroundings so as to allow a user to obtain a photo having desired qualities in various surroundings and a method of controlling the digital image processing apparatus.

In general, a digital image processing apparatus includes all apparatuses that process images of digital cameras, personal digital assistants (PDAs), camera phones, personal computer (PC) cameras, and the like, or use an image recognizing sensor.

The digital image processing apparatus may perform an image processing operation on an image, which is input via an imaging device, by using a digital signal processor (DSP), may generate an image file by compressing the image, and may store the image file in a memory.

Also, the digital image processing apparatus may display the image input via the imaging device or an image of an image file stored in a storage medium on a display apparatus such as a liquid crystal display (LCD).

Meanwhile, the digital image processing apparatus may perform a photographing operation in an automatic photographing mode. Due to the automatic photographing mode, the digital image processing apparatus may automatically control brightness, color, and sharpness of an image according to surroundings so as to allow a user to obtain a photo having desired qualities in various surroundings, and thus may perform an automatic photographing operation.

SUMMARY

The present invention provides a digital image processing apparatus capable of photographing an image of which an International Organization for Standardization (ISO) sensitivity-to-noise ratio is improved by adjusting a size of the image to be photographed in low light conditions, and a method of controlling the digital image processing apparatus.

According to an aspect of the present invention, there is provided a method of controlling a digital image processing apparatus, the method including the operations of receiving an input image; measuring input brightness of the input image; determining whether the input brightness is lower than an appropriate brightness; and generating an intermediate image by reducing a size of the input image by using an add mode for each pixel if the input brightness is lower than the appropriate brightness.

The input brightness may be measured as average brightness in each pixel in the input image.

The input brightness may be increased by reducing the size of the input image.

The size of the input image may be reduced by using the add mode for each pixel within a range greater or equal to a predetermined size until the input brightness becomes greater than the appropriate brightness.

The operation of generating the intermediate image may include the operations of generating an interpolated image by increasing the size of the input image by interpolation; and generating the intermediate image by reducing a size of the interpolated image by using a reduction add filter on the intermediate image.

The interpolated image having a size of the lowest common multiple of the input image and the intermediate image may be generated by performing linear interpolation, and the reduction add filter may be applied to the interpolated image whereby the intermediate image is generated.

The method may further include the operation of storing a photographed image by changing the intermediate image to the predetermined size.

The method may further include the operation of adjusting an aperture so as to increase the input brightness if the input brightness is lower than the appropriate brightness.

The method may further include the operation of adjusting an exposure time so as to increase the input brightness if the input brightness is lower than the appropriate brightness.

The method may further include the operation of adjusting ISO sensitivity so as to increase the input brightness if the input brightness is lower than the appropriate brightness.

After the aperture is opened to a predetermined maximum aperture open position, after the exposure time is increased to a predetermined maximum exposure time, and after the size is reduced to a predetermined minimum size, the ISO sensitivity may be increased within a predetermined ISO sensitivity range.

According to another aspect of the present invention, there is provided a digital image processing apparatus including an image input unit for receiving an input image; and a control unit for measuring input brightness of the input image, and generating an intermediate image by reducing a size of the input image by using an add mode for each pixel when the input brightness is lower than the appropriate brightness.

The input brightness may be measured as average brightness in each pixel in the input image.

The input brightness may be increased by reducing the size of the input image.

The size of the input image may be reduced by using the add mode for each pixel within a range greater or equal to a predetermined size until the input brightness becomes greater than the appropriate brightness.

An interpolated image may be generated by increasing the size of the input image by interpolation, and the intermediate image may be generated by reducing a size of the interpolated image by using a reduction add filter on the intermediate image.

The interpolated image having a size of the lowest common multiple of the input image and the intermediate image may be generated by performing linear interpolation, and the reduction add filter may be applied to the interpolated image whereby the intermediate image is generated.

A photographed image may be stored by changing the intermediate image to the predetermined size.

The digital image processing apparatus may further include an aperture adjusting unit for adjusting an aperture so as to increase the input brightness when the input brightness is lower than the appropriate brightness.

The digital image processing apparatus may further include a shutter adjusting unit for adjusting an exposure time so as to increase the input brightness when the input brightness is lower than the appropriate brightness.

The digital image processing apparatus may further include an ISO sensitivity adjusting unit for adjusting ISO sensitivity so as to increase the input brightness when the input brightness is lower than the appropriate brightness.

After the aperture is opened to a predetermined maximum aperture open position, after the exposure time is increased to a predetermined maximum exposure time, and after the size is reduced to a predetermined minimum size, the ISO sensitivity may be increased within a predetermined ISO sensitivity range.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining exemplary embodiments of the invention with reference to the attached drawings.

Figure 1:
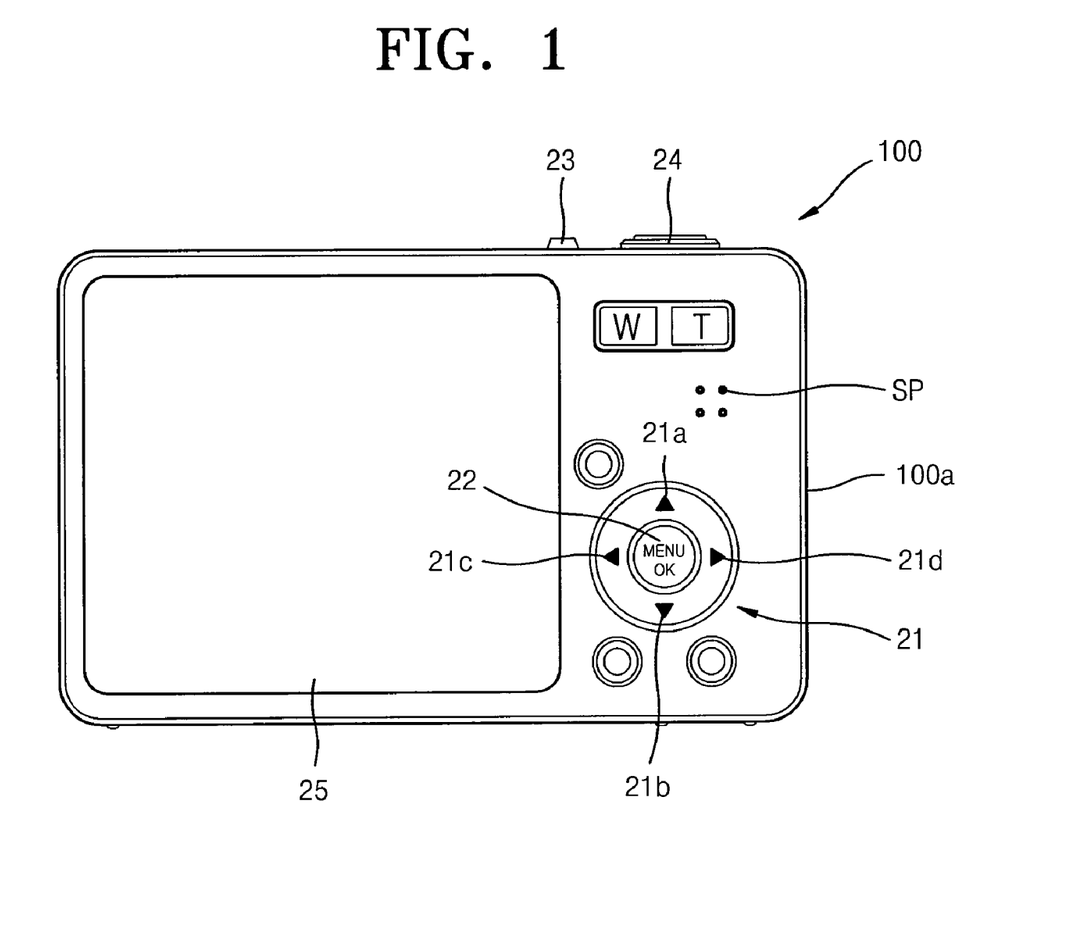
FIG. 1 is a rear view of a digital camera corresponding to a digital image processing apparatus, according to an embodiment of the present invention.

FIG. 1 is a rear view of a digital camera 100 corresponding to a digital image processing apparatus, according to an embodiment of the present invention.

Referring to FIG. 1, a backside of the digital camera 100 may have a direction button 21, a menu-OK button 22, a wide angle-zoom button W, a telephoto-zoom button T, a display panel 25, etc.

The direction button 21 may include four buttons: an up button 21a, a down button 21b, a left button 21c, and a right button 21d. The direction button 21 and the menu-OK button 22 can be pressed to execute various menus about operations of the digital image processing apparatus such as the digital camera 100.

The wide angle-zoom button W and the telephoto-zoom button T respectively function to widen and narrow an angle of view according to an input. In particular, the wide angle-zoom button W and the telephoto-zoom button T may function to modify a dimension of a selected exposed area. Here, if the wide angle-zoom button W is input, the dimension of the selected exposed area may become large, and if the telephoto-zoom button T is input, the dimension of the selected exposed area may become small.

As the display panel 25, an image display device such as a liquid crystal display (LCD) may be used. The display panel 25 may be included in a display unit 350 (see FIG. 3) on which an input image is displayed in a live-view or a stored image is reproduced and displayed.

Meanwhile, a front side or a top side of the digital camera 100, may include a power switch 23, a shutter-release button 24, a flash (not shown), and a lens unit (not shown).

The power switch 23 and the shutter-release button 24 may be included in a user manipulation unit 360 (see FIG. 3) by which a user externally inputs manipulations.

When the power switch 23 is pressed or released, the digital camera 100 may be turned on or off accordingly. A shutter 221 (see FIG. 2) is opened and closed to expose an imaging device (such as a charge-coupled device (CCD) or a film) to light during a predetermined time period by manipulation of the shutter-release button 24.

Also, the shutter-release button 24 operates in conjunction with an aperture (not shown) to appropriately expose an object, and records an image in the imaging device.

As an embodiment of the digital image processing apparatus according to the present invention, a digital camera, a control apparatus therefor, and a method of controlling the same are disclosed in U.S. Patent Publication No. 2004-0130650, entitled Method of Automatically Focusing Using a Quadratic Function in a Camera, by the present applicant herein incorporated by reference.

Details related to the digital camera, the control apparatus therefor, and the method of controlling the same disclosed in the aforementioned application are included in this description, thus, a detailed explanation thereof will be omitted here.

Figure 2:
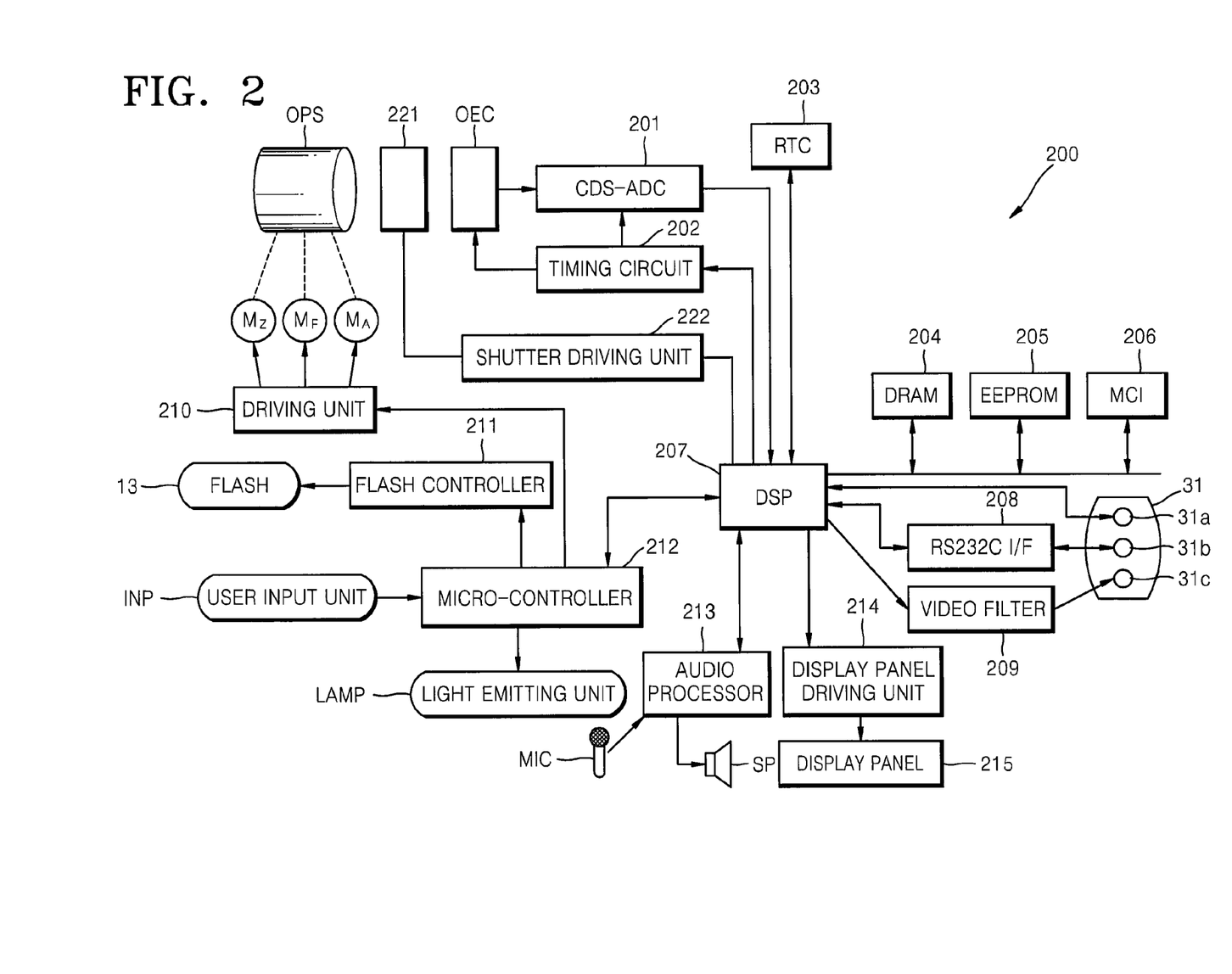
FIG. 2 is a block diagram of a digital image processing apparatus control device according to an embodiment of the present invention.

FIG. 2 is a block diagram of a digital image processing apparatus control device 200 according to an embodiment of the present invention. The digital image processing apparatus control device 200 may be mounted in the digital camera 100 of FIG. 1.

Referring to FIG. 2, an optical system OPS including a lens unit and a filter unit optically processes light from an object. The lens unit of the optical system OPS includes a zoom lens, a focus lens, and a compensation lens. When a user presses a wide angle-zoom button W or a telephoto-zoom button T included in a user input unit INP, a signal corresponding to the wide angle-zoom button W or the telephoto-zoom button T is input to a micro-controller 212.

Accordingly, the micro-controller 212 controls a driving unit 210 so that a zoom motor $M_Z$ is driven to move a zoom lens. That is, when the wide angle-zoom button W is pressed, a focal length of the zoom lens shortens so that an angle of view widens, and when the telephoto-zoom button T is pressed, the focal length of the zoom lens lengthens so that the angle of view narrows.

Meanwhile, in an auto-focusing mode, a main controller embedded in a digital signal processor (DSP) 207 controls the driving unit 210 via the micro-controller 212 so that a focus motor $M_F$ is driven by the driving unit 210. That is, by driving the focus motor $M_F$, the focus lens is moved to a position at which the clearest photo can be obtained.

The compensation lens functions to compensate for a whole refractive index, and thus, the compensation lens is not separately driven. The optical system OPS includes an aperture (not shown) that is adjustable by an aperture adjusting motor $M_A$. The micro-controller 212 controls the driving unit 210 so that the aperture adjusting motor $M_A$ is driven by the driving unit 210 to adjust the aperture.

With respect to the filter unit of the optical system OPS, an optical low pass filter that removes optical noise of a high frequency component may be used. An infrared-cut filter blocks an infrared component of incident light.

An optical-electric conversion unit OEC may include an imaging device such as a charge-coupled device (CCD) or a complementary metal-oxide semiconductor (CMOS). The optical-electric conversion unit OEC converts light from the optical system OPS into an analog signal.

An analog-to-digital converting unit may include a Correlation Double Sampler and Analog-to-Digital Converter (CDS-ADC) 201. The analog-to-digital converting unit processes the analog signal from the optical-electric conversion unit OEC, removes high frequency noise of the analog signal, adjusts the amplitude of the analog signal, and then converts the analog signal into a digital signal. Here, the DSP 207 controls a timing circuit 202, thereby controlling operations of the optical-electric conversion unit OEC and the CDS-ADC 201.

Figure 3:
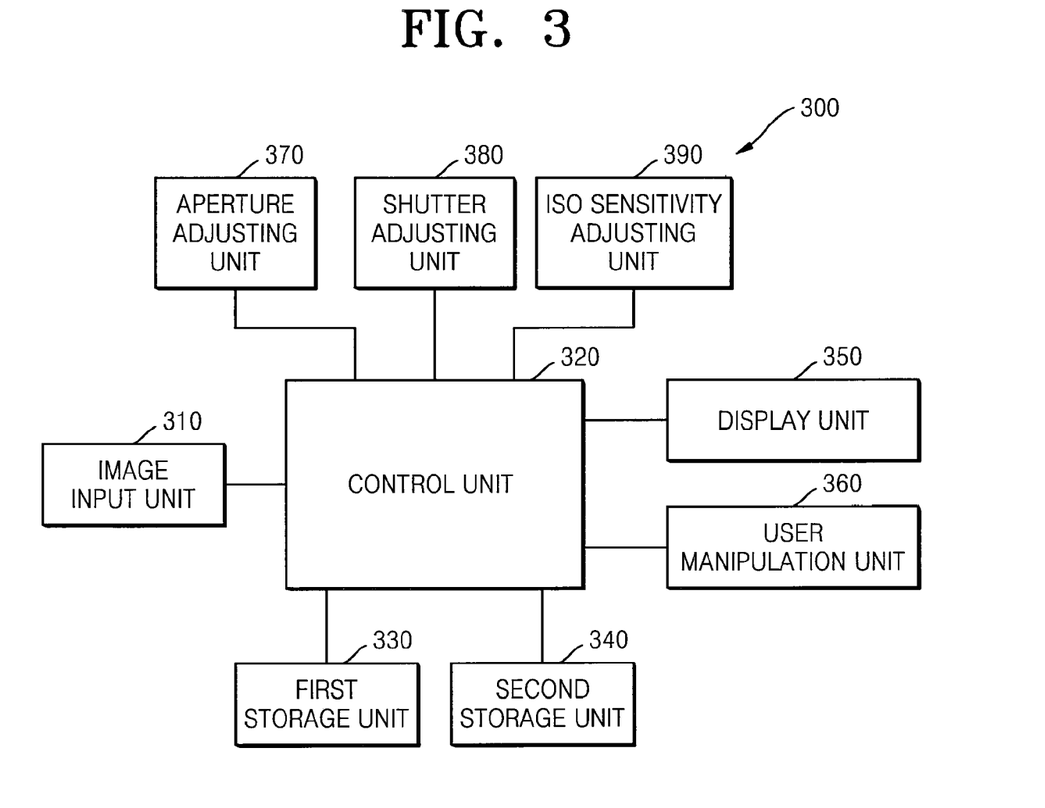
FIG. 3 is a block diagram of a digital image processing apparatus according to another embodiment of the present invention.

The optical system OPS, the optical-electric conversion unit OEC, the CDS-ADC 201, and the like may be included in an image input unit 310 (see FIG. 3) according to an embodiment of FIG. 3.

A real-time clock (RTC) 203 provides the DSP 207 with time information. The DSP 207 processes the digital signal from the CDS-ADC 201, and generates a digital image signal classified into a brightness signal (Y) and a chromaticity signal (R, G, and B).

A light emitting unit LAMP is driven by the micro-controller 212 according to a control by the main controller embedded in the DSP 207, and may include a self-timer lamp, an auto-focus lamp, a mode instruction lamp, a flash standby lamp, etc.

The user input unit INP may include the direction button 21, the wide angle-zoom button W, the telephoto-zoom button T and the like. The user input unit INP may be included in the user manipulation unit 360 (see FIG. 3) according to the embodiment of FIG. 3.

A Dynamic Random Access Memory (DRAM) 204 temporarily stores the digital image signal from the DSP 207. An Electrically Erasable and Programmable Read Only Memory (EEPROM) 205 stores an algorithm and setting data such as a booting program and a key input program which are necessary for operation of the DSP 207. A memory card of a user may removably couple to a memory card interface 206.

The DSP 207 and/or the micro-controller 212 may be included in a control unit 320 (see FIG. 3) according to the embodiment of FIG. 3. Also, as a temporal storage space, a cache memory may be mounted on the DSP 207 and/or the micro-controller 212.

At this time, the cache memory and the DRAM 204 may be included in a first storage unit 330 (see FIG. 3) in which an input image and an intermediate image are temporarily stored. The cache memory may be separated from the DSP 207 and/or the micro-controller 212.

The memory card recognized via the memory card interface 206 may include a photographed image in a non-volatile manner, and may be included in a second storage unit 340 (see FIG. 3).

The digital image signal from the DSP 207 is input to a display panel driving unit 214 so that an image is displayed on a display panel 215.

The digital image processing apparatus control device 200 may further include a display unit including the display panel 215 and the display panel driving unit 214 for driving the display panel 215. The display panel driving unit 214 and the display panel 215 may be included in the display unit 350 (see FIG. 3) according to the embodiment of FIG. 3.

Meanwhile, the digital image signal from the DSP 207 may be transmitted in serial communication via a Universal Serial Bus (USB) connection unit 31a or via a RS232C interface 208 and a connection unit 31b, or may be transmitted as a video signal via a video filter 209 and a video output unit 31c. Here, the DSP 207 may include a micro-controller.

An audio processor 213 outputs a voice signal from a microphone MIC to the DSP 207 or a speaker SP, and outputs an audio signal from the DSP 207 to the speaker SP.

The aperture, the driving unit 210, and the aperture adjusting motor $M_A$ in FIG. 2 may be included in an aperture adjusting unit 370 (see FIG. 3). Also, a shutter 221 and a shutter driving unit 222 in FIG. 2 may be included in a shutter adjusting unit 380 (see FIG. 3). Also, a digital signal processor (DSP) and the optical-electric conversion unit OEC may be included in an ISO sensitivity adjusting unit 390 (see FIG. 3).

FIG. 3 is a block diagram of a digital image processing apparatus 300 according to the embodiment of the present invention. The digital image processing apparatus 300 may be controlled according to a method from among methods S400 and S500 of controlling a digital image processing apparatus as respectively illustrated in FIGS. 4 and 5 and described later with reference to FIGS. 4 and 5.

Referring to FIG. 3, the digital image processing apparatus 300 may include the image input unit 310, the control unit 320, the first and second storage units 330 and 340, the display unit 350, and the user manipulation unit 360.

The image input unit 310 receives an input image. The control unit 320 measures input brightness of the input image, and if the input brightness is lower than an appropriate brightness, the control unit 320 reduces a size of the input image by using an add mode for each pixel.

At this time, in the case where a photographing operation is performed in low light conditions, ISO sensitivity is assured by reducing the size of the input image by using the add mode for each pixel so that the brightness of the input image may be increased without directly increasing the ISO sensitivity.

Meanwhile, the input brightness may be measured as the average brightness in each pixel in the input image. That is, the input brightness may be calculated by obtaining the brightness of each of the pixels of the input image, adding the brightness of each of the pixels, and dividing the sum of the brightness by the number of pixels. However, a method of measuring the input brightness is not limited thereto and thus, the input brightness may be measured using various other methods.

The appropriate brightness, which is compared with the input brightness for determination of whether a current photographing condition corresponds to low light conditions, may be predetermined and stored according to various surroundings.

In the case where the input brightness is lower than the appropriate brightness, the size of the input image may be reduced by using the add mode for each pixel. By reducing the size of the input image by using the add mode for each pixel, the input brightness may be increased. Accordingly, it is possible to photograph an image having sufficient brightness even in low light conditions.

By using the add mode for each pixel, the size of the input image may be reduced within a range greater or equal to a predetermined size until the input brightness becomes greater than or equal to the appropriate brightness. That is, according to variations changed due to predetermined or given conditions, the size of the input image may be reduced by using the add mode for each pixel within the range greater or equal to the predetermined size.

The predetermined size may correspond to a photo size determined by a user before photographing, or the predetermined size may be the size of an image file of an image to be photographed and stored.

Also, the predetermined size may indicate the number of image pixels of the image file of an image to be photographed and stored. In this case, the predetermined size may be defined as the number of horizontal pixels times the number of vertical pixels. Even when the predetermined size indicates the size of the image file, a size defined as the number of horizontal pixels times the number of vertical pixels may also indicate the predetermined size according to each size.

By reducing the input image by using the add mode for each pixel according to a set value, the number of pixels of the input image may be reduced so that the brightness of the input image may be increased without increasing the ISO sensitivity.

For example, with respect to an imaging device capable of receiving an input image of a 12-megabyte (hereinafter, 'M') size, a predetermined size of an image to be photographed may be set as a 3M size according to a postcard size print.

At this time, the input brightness may be increased by using a 4-pixel add mode for each pixel. By using the 4-pixel add mode, ISO sensitivity of 2 F-stops may be increased without directly increasing the ISO sensitivity.

Here, since the ISO sensitivity is not increased, noise is not increased. Thus, by reducing the size of the input image by using the add mode for each pixel, the brightness of the input image may be increased without increasing noise.

In the case where the size is reduced by an integer multiple, the size of the input image may be reduced by using only an add mode so that the brightness of the photographed image may be increased without increasing noise.

Meanwhile, in the case where the size is not reduced by the integer multiple, the size of the input image may be increased by interpolation so that an interpolated image may be generated, and a reduction add filter may be used on the interpolated image so as to reduce the size of the interpolated image. At this time, an intermediate image may be generated by reducing the size of the interpolated image by using the reduction add filter on the interpolated image.

For example, with respect to the imaging device capable of receiving an input image of a 12M size, a predetermined size of an image to be photographed may be set as a 5M size for an A4 printing paper size print.

In this case, the interpolated image may be generated by linear interpolation. Due to interpolation, an interpolated image 70 (see FIG. 7) may have pixels that are 2×2 times greater than those of the input image. Also, the size of the interpolated image may be reduced by using a 3×3 reduction add filter on the interpolated image. The interpolated image may be an image having a size of the lowest common multiple of the input image and the intermediate image, and may be generated by performing linear interpolation.

Meanwhile, the digital image processing apparatus 300 may generate the intermediate image by reducing the size of the input image by using the add mode for each pixel. Hence, the intermediate image may be an image that is generated because the size of the intermediate image is reduced by using the add mode for each pixel. Thus, it is possible to store a photographed image by changing the size of the intermediate image to a predetermined size.

An embodiment, with reference to FIGS. 6 through 9, illustrates that the size of the input image is reduced by using the add mode for each pixel according to the generation and size reduction of the interpolated image.

Meanwhile, the digital image processing apparatus 300 may further include the aperture adjusting unit 370, the shutter adjusting unit 380, and the ISO sensitivity adjusting unit 390.

In the case where the input brightness is lower than the appropriate brightness, the aperture adjusting unit 370 may adjust an aperture so as to increase the input brightness. In the case where the input brightness is lower than the appropriate brightness, the shutter adjusting unit 380 may adjust an exposure time so as to increase the input brightness. In the case where the input brightness is lower than the appropriate brightness, the ISO sensitivity adjusting unit 390 may adjust ISO sensitivity so as to increase the input brightness.

First, the aperture may be opened by the aperture adjusting unit 370 and an increase of the exposure time may be prevented due to the shutter adjusting unit 380 so that a condition of low hand-shake may occur. Accordingly, a control operation with respect to the aperture and the exposure time may be performed under the condition of low hand-shake.

Also, in the case where the amount of light is insufficient in spite of controlling the aperture and the exposure time, the brightness may be assured by not only increasing the ISO sensitivity but also by reducing the size of the input image by using the add mode for each pixel, without increasing noise. At this time, the adjustment of the ISO sensitivity may be performed by controlling the image input unit 310 via to the control unit 320.

At this time, even though an image size may be a minimum size, if the input image does not have desired appropriate brightness, the brightness of the input image may be additionally increased by adjusting the ISO sensitivity.

The image input unit 310 receives an input image from an external source. The image input unit 310 may include the optical system OPS, the optical-electric conversion unit OEC, and the CDS-ADC 201 which are illustrated in FIG. 2.

The control unit 320 may control the image input unit 310, the first and second storage units 330 and 340, the display unit 350, the user manipulation unit 360, the aperture adjusting unit 370, the shutter adjusting unit 380, and the ISO sensitivity adjusting unit 390, thereby allowing an image, which is bright compared with the ISO sensitivity, to be photographed even in low light conditions. The control unit 320 may include the DSP 207 and/or the micro-controller 212 which are illustrated in FIG. 2.

The input image and the photographed image may be stored in the first and second storage units 330 and 340. The first storage unit 330 may temporarily store the input image, the interpolated image, the intermediate image, etc. The second storage unit 340 may store the photographed image.

The display unit 350 may include the display panel 25 of FIG. 1 and/or the display panel driving unit 214 and the display panel 215 of FIG. 2. A user may externally input desired instructions via the user manipulation unit 360. Also, the user manipulation unit 360 may include the power switch 23 and the shutter-release button 24 of FIG. 1, and/or the user input unit INP of FIG. 2.

The digital image processing apparatus 300 according to the present embodiment may photograph an image in which the amount of hand-shake is reduced by adjusting the aperture and the exposure time, may photograph an image of which the ISO sensitivity-to-noise ratio is improved by adjusting a size of the image to be photographed in low light conditions.

Figure 4:
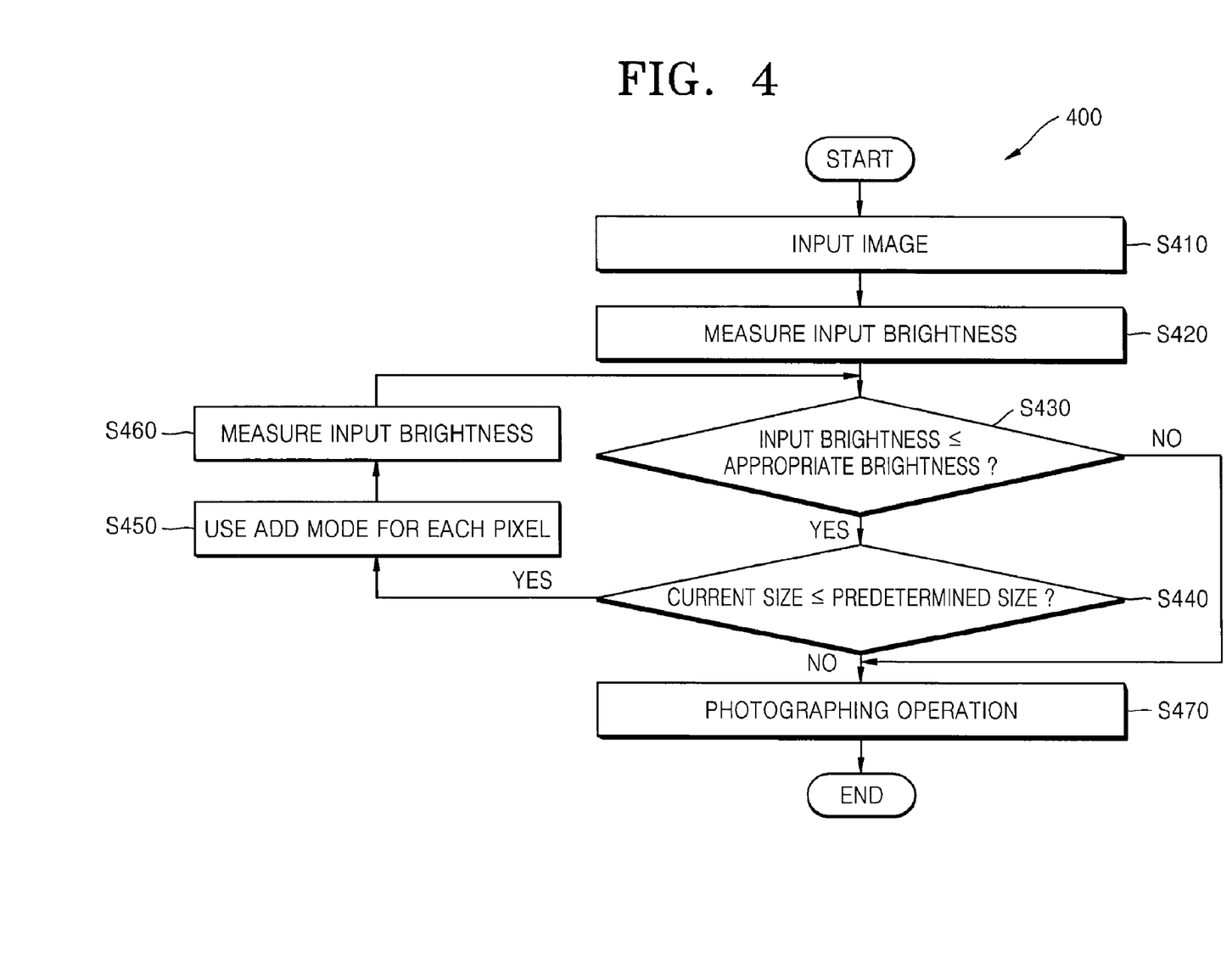
FIG. 4 is a flowchart of a method of controlling a digital image processing apparatus, according to an embodiment of the present invention.

FIG. 4 is a flowchart of the method S400 of controlling a digital image processing apparatus, according to an embodiment of the present invention.

The method S400 may be implemented in the digital image processing apparatus control device 200 of FIG. 2 and the digital image processing apparatus 300 of FIG. 3. For the implementation, the method S400 according to the present embodiment may be stored in a storage medium of FIG. 2 or may be a program or an algorithm implemented as Firmware in a semiconductor chip.

Thus, detailed descriptions thereof, which are the same as those regarding the digital image processing apparatus control device 200 and the digital image processing apparatus 300, will be omitted here.

Referring to FIG. 4, the method S400 may include operations of receiving an input image (operation S410); measuring brightness of the input image (operation S420); determining the brightness of the input image (operation S430); and adjusting a size of the input image (operations S440 and S450).

The input image is received in operation S410. The input brightness of the input image is measured in operation S420. Whether the input brightness is lower than an appropriate brightness is determined in operation S430. If the input brightness is lower than the appropriate brightness, a size of the input image is reduced by using an add mode for each pixel in operations S440 and S450.

A digital image processing apparatus controlling method according to the related art may increase the brightness of the input image by adjusting ISO sensitivity so as to perform a photographing operation in low light conditions. However, if the ISO sensitivity is increased, noise in the input image may also be increased.

Thus, in the case where the photographing operation is performed in low light conditions, the method S400 according to the present embodiment may reduce the size of the input image by using the add mode for each pixel so as to assure the ISO sensitivity and may increase the brightness of the input image without directly increasing the ISO sensitivity.

In operation 420, the input brightness of the input image is measured. At this time, the input brightness of the input image may be measured as an average brightness in each pixel in the input image. That is, the input brightness of the input image may be calculated by obtaining the brightness of each of the pixels of the input image, adding the brightness of each of the pixels, and dividing the sum of the brightness by the number of pixels. However, the method of measuring the input brightness is not limited thereto and thus, the input brightness may be performed using various other methods.

In operation S430, whether the input brightness is lower than the appropriate brightness is determined. For the determination, the input brightness may be compared with the appropriate brightness. The appropriate brightness may be predetermined and stored according to various surroundings.

As a result of the comparison between the input brightness and the appropriate brightness, which is performed in operation S430, if the input brightness is greater or equal to the appropriate brightness, the input image may be photographed according to a current size of the input image (operation S470). If the input brightness is lower than the appropriate brightness, operations S440 and S450 may be performed to adjust the size of the input image.

Here, a predetermined size may correspond to a photo size determined by a user before photographing, or the predetermined size may indicate a size of an image file of an image to be photographed and stored.

Also, the predetermined size may indicate the number of image pixels of the image file of an image to be photographed and stored. In this case, the predetermined size may be defined as the number of horizontal pixels times the number of vertical pixels. Even when the predetermined size indicates the size of the image file, a size defined as the number of horizontal pixels times the number of vertical pixels may also indicate the predetermined size according to each size.

If the input brightness is lower than the appropriate brightness, the size of the input image is reduced by using the add mode for each pixel in operations S440 and S450. At this time, by reducing the size of the input image by using the add mode for each pixel, the input brightness may be increased. Accordingly, it is possible to photograph an image having sufficient brightness even in low light conditions.

At this time, the size of the input image may be reduced by using the add mode for each pixel within a range greater or equal to a predetermined size until the input brightness becomes greater than or equal to the appropriate brightness. That is, according to variations changed due to predetermined or given conditions, the size of the input image may be reduced by using the add mode for each pixel within the range greater or equal to the predetermined size.

Operations S440 and S450 may include operations of comparing sizes (operation S440); and using the add mode for each pixel (operation S450).

In operation S440, the current size of the input image may be compared with the predetermined size. In operation S450, the input image may be reduced to a predetermined level by using the add mode for each pixel.

As a result of the comparison in operation S440, if the current size of the input image is less than the predetermined size, operation S450 may be performed so as to use the add mode for each pixel. If the current size of the input image is greater than the predetermined size otherwise, operation S470 may be performed so as to photograph the input image according to the current size of the input image.

Thus, operation S450 may be performed within a range in which the size of the input image is greater or equal to the predetermined size.

By reducing the input image to the predetermined level by using the add mode for each pixel in operation S450, the number of pixels of the input image may be reduced so that the brightness of the input image may be increased.

For example, with respect to an imaging device capable of receiving an input image of a 12M size, a predetermined size of an image to be photographed may be set as a 3M size according to a postcard size print.

At this time, in operation S450, the input brightness may be increased by using a 4-pixel add mode for each pixel. By using the 4-pixel add mode, ISO sensitivity of 2 F-stops may be increased without a direct increasing of the ISO sensitivity.

Here, since the ISO sensitivity is not increased, noise is not increased. Thus, by reducing the size of the input image by using the add mode for each pixel, the brightness of this input image may be increased without increasing noise.

In the case where the size is reduced by an integer multiple, the size of the input image may be reduced by using only an add mode so that the brightness of the photographed image may be increased without increasing noise.

Meanwhile, in the case where the size is not reduced by the integer multiple, operation S450 may include operations of generating an interpolated image and reducing a size of the interpolated image so that the size of the input image may be reduced by using the add mode for each pixel.

In the operation of generating the interpolated image, the size of the input image may be increased by interpolation so that the interpolated image may be generated. In the operation of reducing the size, a reduction add filter may be used on the interpolated image so as to reduce a size of the interpolated image. At this time, an intermediate image may be generated by reducing the size of the interpolated image by using the reduction add filter on the interpolated image.

For example, with respect to the imaging device capable of receiving an input image of a 12M size, a predetermined size of an image to be photographed may be set as a 5M size for an A4 printing paper size print.

In this case, in the operation of generating the interpolated image, the interpolated image may be generated by linear interpolation. At this time, the interpolated image may be an image having a size of the lowest common multiple of the input image and the intermediate image, and may be generated by performing linear interpolation. Also, in the operation of reducing the size of the interpolated image, the size of the interpolated image may be reduced by using a 3×3 reduction add filter on the interpolated image so that the intermediate image may be generated.

The method S400 according to the present embodiment may further include operation S460 in which the input brightness of the input image is measured, wherein the input image is converted by being reduced in size in operation S450. At this time, after the input brightness is measured, the input brightness of the input image, which is converted by being reduced in size, is compared with the appropriate brightness in operation S430.

If the input brightness is greater than or equal to the appropriate brightness, operation S470 is performed so as to photograph the input image, and when the input brightness is lower than the appropriate brightness otherwise, operations S440 and S450 are performed again so as to adjust the size of the input image.

Meanwhile, the method S400 according to the present embodiment may generate the intermediate image by reducing the size of the input image by using the add mode for each pixel. At this time, the intermediate image may be an image that is generated due to that a size of the intermediate image is reduced by using the add mode for each pixel in operation S450. Thus, in operation S470, it is possible to store a photographed image by changing the size of the intermediate image to the predetermined size.

The embodiment with reference to FIGS. 6 through 9 illustrates as example of when the size of the input image is reduced by using the add mode for each pixel according to operations of generating the interpolated image and reducing the size of the interpolated image.

Figure 6:
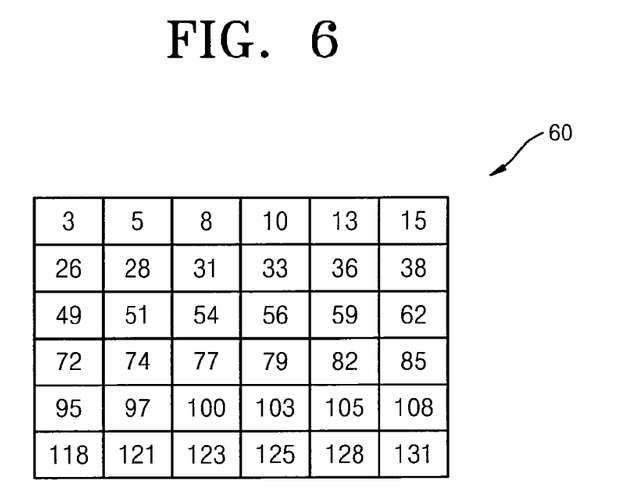
FIG. 6 is a diagram of an input image to which the method according to the embodiment of FIG. 4 is to be applied.

FIG. 6 is a diagram of an input image 60 to which the method S400 according to the embodiment of FIG. 4 is applied. Here, the input image 60, which is first received via an imaging device, has a size of 6×6 pixels. The input image 60 is input with ISO sensitivity of 500 and has brightness Y of 67.

Figure 7:
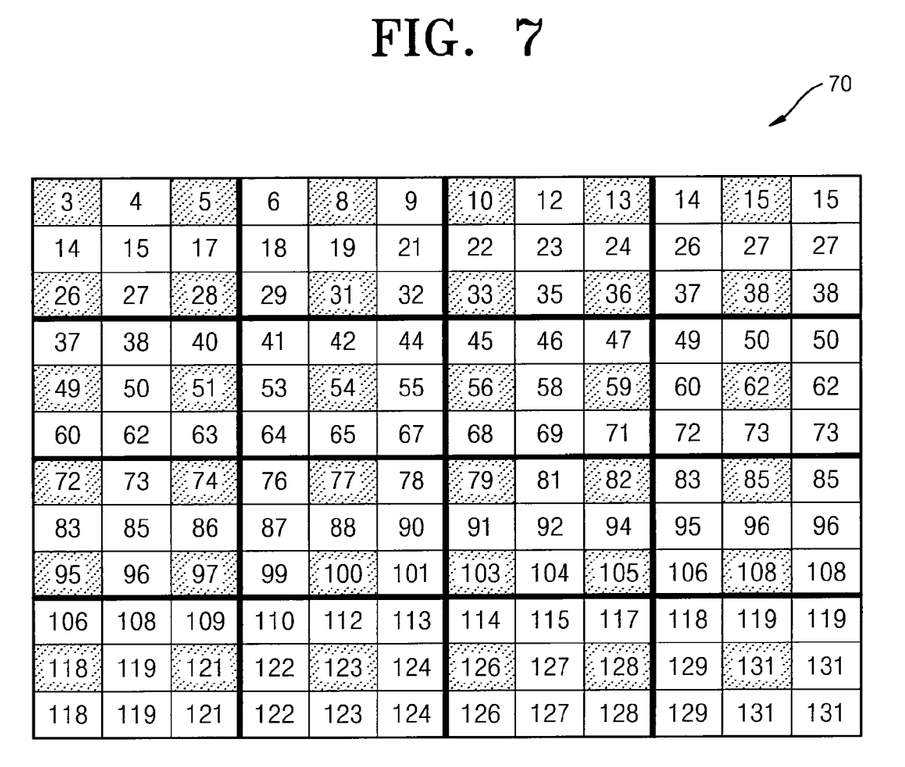
FIG. 7 is a diagram of an interpolated image that is generated by linear interpolation on the input image of FIG. 6.
Figure 8:
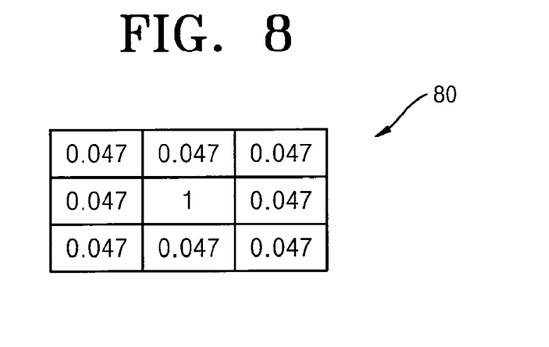
FIG. 8 is a diagram of a 3×3 add filter for generating an intermediate image with respect to the interpolated image of FIG. 7.

FIG. 7 is a diagram of an interpolated image 70 that is generated by linear interpolation on the input image 60 of FIG. 6. Also, FIG. 8 is a diagram of a 3×3 add filter 80 for generating an intermediate image with respect to the interpolated image 70 of FIG. 7.

The 3×3 add filter 80 may be used by applying a weight of 1 to a center pixel and determining a weight of each of the neighbouring 8 pixels as 0.047 so as to set a sum of weights of the center pixel and the neighbouring 8 pixels to be $\frac{3}{2}$ and to decrease the ISO sensitivity of 500 by $\frac{2}{3}$.

Figure 9:
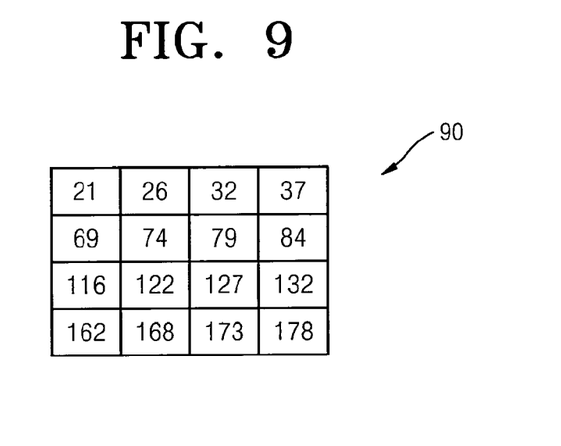
FIG. 9 is a diagram of an intermediate image that is generated by reducing a size of the input image of FIG. 6 by using an add mode for each pixel.

FIG. 9 is a diagram of an intermediate image 90 that is generated by reducing the size of the input image 60 of FIG. 6 by using an add mode for each pixel. That is, the intermediate image 90 is generated by applying the 3×3 add filter 80 to each of the 3×3 pixel units of the interpolated image 70, and is an image having 4×4 pixels.

That is, the intermediate image 90 may be generated by addition and reduction of the input image 60 by a rate of $\frac{2}{3}$. At this time, the intermediate image 90 is an image having brightness Y of 100, which is input with the ISO sensitivity of 500. Thus, it is possible to increase the brightness of the input image 60 from 67 to 100 by reducing the size of the input image 60 while maintaining the same ISO sensitivity of 500.

Figure 10:
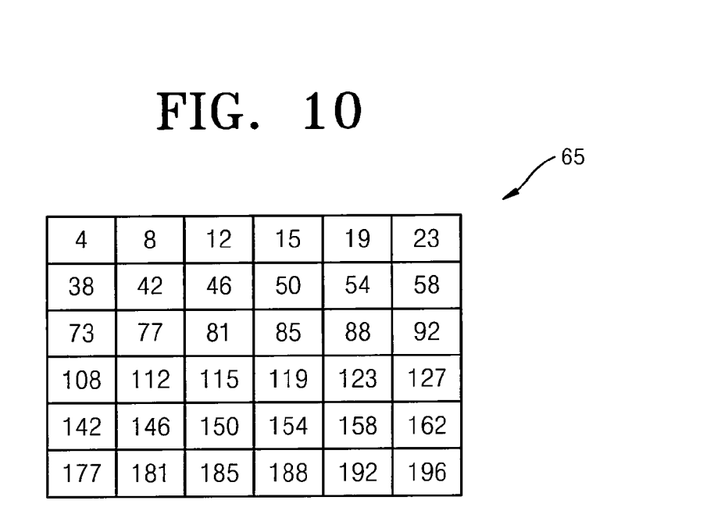
FIG. 10 is a diagram of a comparison image of which the brightness is adjusted by modifying ISO sensitivity while maintaining the same size, with respect to the input image of FIG. 6.

FIG. 10 is a diagram of a comparison image 65 of which the brightness is adjusted by modifying the ISO sensitivity while maintaining the same size, with respect to the input image 60 of FIG. 6. For example, in a condition in which the input image 60 is input, in order to have the brightness Y of 100, which is an appropriate brightness, while maintaining a size of 6×6 pixels equal to that of the input image 60, the ISO sensitivity has to be 800.

In order to allow an input image to have an appropriate brightness of 100 while maintaining its size, without using the one or more embodiments of the present invention, the ISO sensitivity has to be increased. In this case, noise is also increased along with an increase of the ISO sensitivity. However, according to the one or more embodiments of the present invention, a size of the input image is reduced by using the add mode for each pixel without increasing the ISO sensitivity so that the brightness of the input image may be increased without increasing noise.

According to the one or more embodiments of the present invention, it is possible to photograph an image of which the ISO sensitivity-to-noise ratio is improved by adjusting a size of the image to be photographed in low light conditions.

Figure 5:
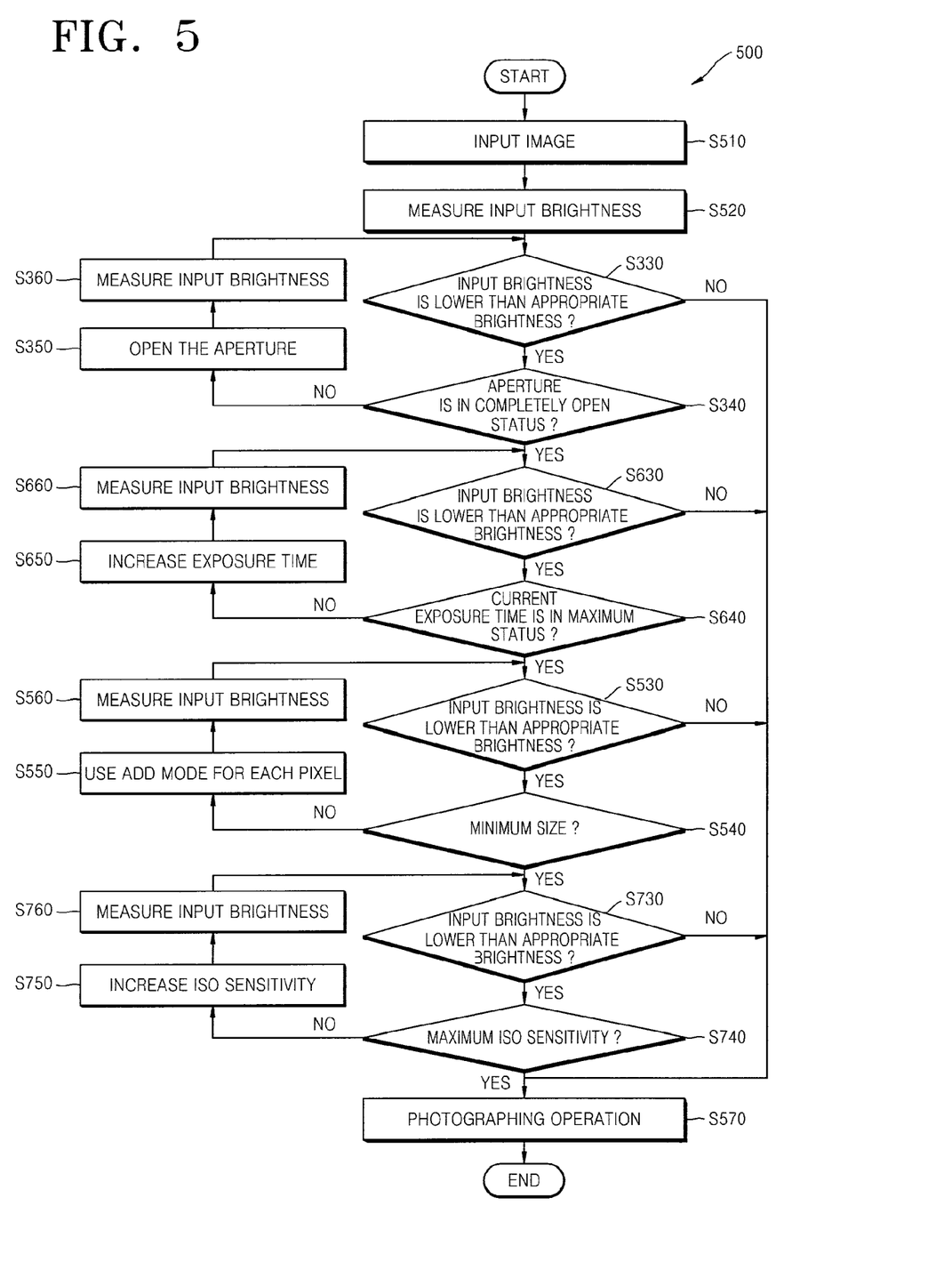
FIG. 5 is a flowchart of a method of controlling a digital image processing apparatus, according to another embodiment of the present invention.

FIG. 5 is a flowchart of the method S500 of controlling a digital image processing apparatus, according to another embodiment of the present invention.

The method S500 may be implemented in the digital image processing apparatus control device 200 of FIG. 2 and the digital image processing apparatus 300 of FIG. 3. For the implementation, the method S500 according to the present embodiment may be stored in a storage medium of FIG. 2 or may be a program or an algorithm implemented as Firmware in a semiconductor chip.

Thus, detailed descriptions thereof, which are the same as those regarding the digital image processing apparatus control device 200, the digital image processing apparatus 300 and the method S400, will be omitted here.

Referring to FIG. 5, the method S500 may include operations of receiving an input image (operation S510); measuring brightness (operation S520); adjusting an aperture (operations S330 through S360); adjusting an exposure time (operations S630 through S660); adjusting an image size (operations S530 through S560); and adjusting ISO sensitivity (operations S730 through S760).

In operation S510, the input image is received. In operation S520, the input brightness of the input image is measured.

In operations S330 through S360, when the input brightness is lower than an appropriate brightness, the aperture is adjusted to increase the input brightness. In operations S630 through S660, when the input brightness is lower than the appropriate brightness, the exposure time is adjusted to increase the input brightness.

In operations S530 through S560, when the input brightness is lower than the appropriate brightness, a size of the input image is reduced by using an add mode for each pixel. In operations S730 through S760, when the input brightness is lower than the appropriate brightness, the ISO sensitivity is adjusted to increase the input brightness.

The method S500 may perform a photographing operation according to an automatic image processing algorithm for automatically controlling brightness, color, and sharpness of the input image so as to allow a user to obtain a photo having desired qualities in various surroundings. At this time, in high light conditions, the method S500 may perform a control operation by which ISO sensitivity of an imaging device may be decreased, the exposure time may be reduced, and the aperture may be narrowed so as to allow an image having an appropriate brightness to be photographed within an exposure range that minimizes the effect on the image of the user's hand shaking during the photographing operation.

In low light conditions, the method S500 may perform an automatic control operation by which the aperture is open, and the exposure time is increased to a level at which the effect of the user's hand shaking may not be evident. In spite of this, if the appropriate brightness is not assured, the method S500 may increase the ISO sensitivity of a sensor to an allowed level, and if the appropriate brightness is still not assured, the method S500 may control the photographing operation to be performed in a dark condition as much as a difference between the current brightness and the appropriate brightness.

However, in order to reduce the effect of hand-shake on the image in low light and dark conditions at night, the ISO sensitivity may be undesirably increased and thus noise may also be increased. Thus, most users perform short-distance photographing operation by using a flash in very dark conditions such as at night, or are inconvenienced due to a usage of a tripod for distance photographing operations at night.

However, in the case where the photographing operation is performed in low light conditions, the method S500 may assure the ISO sensitivity by reducing the size of the input image by using the add mode for each pixel, thereby increasing the brightness of the input image without directly increasing the ISO sensitivity.

For this, according to operations S330 through S360 and operations S630 through S660, the aperture may be opened and an increase of the exposure time may be limited so as to create a condition in which the hand-shake is minimized. Also, in the case where an amount of light is not sufficient in spite of controlling the aperture and the exposure time, the brightness may be assured, without increasing noise, by not only increasing the ISO sensitivity but also by reducing the size of the input image by using the add mode for each pixel.

In operations S530 through S560, a user determined size, which satisfies a purpose of the photographing operation, may be set as a minimum size, and the add mode for each pixel may be applied to an image size, so that the ISO sensitivity may be assured and the increase in noise may be minimized.

Here, in the case where the input image does not have the appropriate brightness even when the image size becomes the minimum size, the ISO sensitivity may be adjusted to increase the brightness.

In operations S330 through S360, when the input brightness is lower than the appropriate brightness, the aperture is adjusted to increase the input brightness.

Operations S330 through S360 may further include operations of determining the brightness (operation S330), determining an aperture status (operation S340), opening the aperture (operation S350), and measuring the input brightness (operation S360).

In operation S330, it is determined whether the input brightness is lower than predetermined appropriate brightness. In operation S340, it is determined whether a current aperture status is a completely open status.

In operation S350, if the current aperture status is not the completely open status, the aperture is opened to a set open status. In operation S360, the input brightness is measured when the aperture is opened according to operation S350.

At this time, the input image may be input again in an aperture status that is adjusted to measure the input brightness, and then the input brightness of the input image may be measured.

In operations S330 through S360, the brightness of the input image may be increased by opening the aperture to an extent that the aperture can be opened. At this time, in the case where the desired appropriate brightness of the input image is not assured even when the aperture is opened to a maximum level, the exposure time may be adjusted to increase the brightness in operations S630 through S660.

In operations S630 through S660, when the input brightness is lower than the appropriate brightness, the exposure time is adjusted to increase the input brightness. Operations S630 through S660 may further include operations of determining the brightness (operation S630), determining the exposure time (operation S640), increasing the exposure time (operation S650), and measuring the input brightness (operation S660).

In operation S630, it is determined whether the input brightness is lower than the predetermined appropriate brightness. In operation S640, it is determined whether a current exposure time corresponds to a maximum status.

In operation S650, if the current exposure time does not correspond to the maximum status, the exposure time is increased to a set increase status. In operation S660, the input brightness of a status, in which the exposure time is increased via operation S650, is measured.

At this time, the input image may be input again at the exposure time that is adjusted to measure the input brightness, and then the input brightness of the input image may be measured.

In operations S630 through S660, the brightness of the input image may be increased by increasing the exposure time to an extent that the exposure time can be increased. At this time, in the case where the desired appropriate brightness of the input image is not assured even when the exposure time is increased to a maximum level, the brightness may be increased by adjusting the image size in operations S530 through S560.

In operations S530 through S560, when the input brightness is lower than the appropriate brightness, the size of the input image is reduced by using the add mode for each pixel. Operations S530 through S560 may include operations of determining the brightness (operation S530), comparing sizes (operation S540), using the add mode for each pixel (operation S550), and measuring the input brightness (operation S560).

In operation S530, it is determined whether the input brightness is lower than the predetermined appropriate brightness. In operation S540, a current size of the input image may be compared with a predetermined size.

In operation S550, the input image may be reduced to a set level by using the add mode for each pixel. In operation S560, the input brightness of the input image is measured.

In operations S530 through S560, the brightness of the input image may be increased by reducing the image size to an extent that the image size can be reduced. At this time, in the case where the desired appropriate brightness of the input image is not assured even when the image size is set as the predetermined size, the brightness may be increased by adjusting the ISO sensitivity in operations S730 through S760.

In operations S730 through S760, when the input brightness is lower than the appropriate brightness, the ISO sensitivity is adjusted to increase the input brightness. Operations S730 through S760 may include operations of determining the brightness (operation S730), determining the ISO sensitivity (operation S740), increasing the ISO sensitivity (operation S750), and measuring the input brightness (operation S760).

In operation S730, it is determined whether the input brightness is lower than the predetermined appropriate brightness. In operation S740, it is determined whether current ISO sensitivity corresponds to a maximum status.

In operation S750, if the current ISO sensitivity does not correspond to the maximum status, the ISO sensitivity is increased to a set increase status. In operation S760, the input brightness of a status, in which the ISO sensitivity is increased via operation S750, is measured.

At this time, the input image may be input again at the ISO sensitivity that is adjusted to measure the input brightness, and then the input brightness of the input image may be measured.

In operations S730 through S760, the brightness of the input image may be increased by increasing the ISO sensitivity to an extent that the ISO sensitivity can be increased. At this time, although the desired appropriate brightness of the input image is not assured even when the ISO sensitivity is increased to a maximum level, a photographing operation is performed in a low light status in operation S570.

Meanwhile, if it is determined that the input brightness is higher than the predetermined appropriate brightness in operations S330, S530, S630, and S730 which are respectively included in operations S330 through S360, operations S630 through S660, operations S530 through S560, and operations S730 through S760, operation S570 may be performed to receive an image in a current status and to perform the photographing operation.

The method S500 according to the present embodiment may set a priority order with respect to an automatic photographing control in low light conditions or in low light and dark conditions, wherein the priority order is in an order of the aperture, the exposure time, the size of the image, and the ISO sensitivity, so that adjustment may be performed according to the priority order.

Thus, in operations S330 through S360 and operations S630 through S660, the aperture may be opened and the increase of the exposure time may be limited so as to create the condition in which the hand-shake occurs less.

At this time, in the case where the amount of light is not sufficient in spite of controlling the aperture and the exposure time, the brightness may be assured by not only increasing the ISO sensitivity but also by reducing the size of the input image by using the add mode for each pixel without increasing noise in operations S530 through S560.

Also, in the case where the desired appropriate brightness of the input image is not assured even when the image size is set as the predetermined size, the brightness may be increased by adjusting the ISO sensitivity in operations S730 through S760.

According to the one or more embodiments of the present invention, it is possible to photograph a hand-shake reduced image by adjusting the aperture and the exposure time, and to photograph an image of which an ISO sensitivity-to-noise ratio is improved by adjusting a size of the image to be photographed in low light conditions.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A method of controlling a digital image processing apparatus, the method comprising:
  receiving an input image;
  measuring an input brightness of the input image;
  determining whether the input brightness is lower than a brightness according to a predefined criteria;
  generating an intermediate image by reducing a size of the input image by using an add mode for each pixel if the input brightness is lower than the brightness according to a predefined criteria; and
  reducing the size of the input image by using the add mode for each pixel within a range greater or equal to a predetermined size until the input brightness becomes greater than the brightness according to a predefined criteria.

2. The method of claim 1, wherein the input brightness is measured as an average brightness in each pixel in the input image.

3. The method of claim 2 further comprising increasing the input brightness by reducing the size of the input image.

4. A method of controlling a digital image processing apparatus, the method comprising:
  receiving an input image;
  measuring an input brightness of the input image;
  determining whether the input brightness is lower than a brightness according to a predefined criteria; and
  generating an intermediate image by reducing a size of the input image by using an add mode for each pixel if the input brightness is lower than the brightness according to a predefined criteria,
  wherein the generating of the intermediate image comprises:
  generating an interpolated image by increasing the size of the input image by interpolation; and
  generating the intermediate image by reducing a size of the interpolated image by using a reduction add filter on the intermediate image, and
  wherein the interpolated image having a size of the lowest common multiple of the input image and the intermediate image is generated by performing linear interpolation, and the reduction add filter is applied to the interpolated image whereby the intermediate image is generated.

5. The method of claim 4, further comprising storing a photographed image by changing the intermediate image to the predetermined size.

6. A method of controlling a digital image processing apparatus, the method comprising:
  receiving an input image;
  measuring an input brightness of the input image;
  determining whether the input brightness is lower than a brightness according to a predefined criteria; and
  generating an intermediate image by reducing a size of the input image by using an add mode for each pixel if the input brightness is lower than the brightness according to a predefined criteria,
  if the input brightness is lower than the brightness according to a predefined criteria, adjusting an aperture so as to increase the input brightness,
  if the input brightness is lower than the brightness according to a predefined criteria, adjusting an exposure time so as to increase the input brightness,
  if the input brightness is lower than the brightness according to a predefined criteria, adjusting ISO (International Organization for Standardization) sensitivity so as to increase the input brightness, and
  wherein, after the aperture is opened to a predetermined maximum aperture open position, after the exposure time is increased to a predetermined maximum exposure time, and after the size is reduced to a predetermined minimum size, the ISO sensitivity is increased within a predetermined ISO sensitivity range.

7. A digital image processing apparatus, comprising:
  an image input unit for receiving an input image; and
  a control unit for measuring input brightness of the input image, and generating an intermediate image by reducing a size of the input image by using an add mode for each pixel when the input brightness is lower than a brightness according to a predefined criteria,
  wherein the size of the input image is reduced by using the add mode for each pixel within a range greater or equal to a predetermined size until the input brightness becomes greater than the brightness according to a predefined criteria.

8. The digital image processing apparatus of claim 7, wherein the input brightness is measured as average brightness in each pixel in the input image.

9. The digital image processing apparatus of claim 8, wherein the input brightness is increased by reducing the size of the input image.

10. A digital image processing apparatus, comprising:
  an image input unit for receiving an input image; and
  a control unit for measuring input brightness of the input image, and generating an intermediate image by reducing a size of the input image by using an add mode for each pixel when the input brightness is lower than a brightness according to a predefined criteria,
  wherein an interpolated image is generated by increasing the size of the input image by interpolation, and the intermediate image is generated by reducing a size of the interpolated image by using a reduction add filter on the intermediate image, and
  wherein the interpolated image having a size of the lowest common multiple of the input image and the intermediate image is generated by performing linear interpolation, and the reduction add filter is applied to the interpolated image whereby the intermediate image is generated.

11. The digital image processing apparatus of claim 10 further comprising a data store holding a photographed image that is stored by changing the intermediate image to the predetermined size.

12. A digital image processing apparatus, comprising:
  an image input unit for receiving an input image;
  a control unit for measuring input brightness of the input image, and generating an intermediate image by reducing a size of the input image by using an add mode for each pixel when the input brightness is lower than a brightness according to a predefined criteria;
  an aperture adjusting unit for adjusting an aperture so as to increase the input brightness when the input brightness is lower than the brightness according to a predefined criteria;

a shutter adjusting unit for adjusting an exposure time so as to increase the input brightness when the input brightness is lower than the brightness according to a predefined criteria;

an ISO sensitivity adjusting unit for adjusting ISO sensitivity so as to increase the input brightness when the input brightness is lower than the brightness according to a predefined criteria, wherein, after the aperture is opened to a predetermined maximum aperture open position, after the exposure time is increased to a predetermined maximum exposure time, and after the size is reduced to a predetermined minimum size, the ISO sensitivity is increased within a predetermined ISO sensitivity range.

* * * * *